United States Patent [19]

Yamazaki et al.

[11] Patent Number: 4,556,918
[45] Date of Patent: Dec. 3, 1985

[54] METHOD AND APPARATUS FOR GENERATING SCREENED HALFTONE IMAGES

[75] Inventors: Taro Yamazaki, Hyogo; Masashi Okamoto, Akashi; Tokio Iizuka, Yokohama; Norishige Tsukada, Matsudo; Kenji Okamori, Tokyo, all of Japan

[73] Assignee: Kabushiki Kaisha Sakata Shokai, Osaka, Japan

[21] Appl. No.: 564,235

[22] Filed: Dec. 21, 1983

[30] Foreign Application Priority Data

Dec. 27, 1982 [JP] Japan ................. 57-230759

[51] Int. Cl.$^4$ .................. H04N 1/40; H04N 1/22
[52] U.S. Cl. .................... 358/283; 358/280; 358/298
[58] Field of Search ............... 358/283, 280, 298

[56] References Cited

U.S. PATENT DOCUMENTS

| 3,916,096 | 10/1975 | Everett et al. | 358/283 |
|---|---|---|---|
| 4,280,144 | 7/1981 | Bacon | 358/280 |
| 4,449,150 | 5/1984 | Kato | 358/283 |
| 4,485,408 | 11/1984 | Kamizyo et al. | 358/283 |
| 4,486,788 | 12/1984 | Yamada | 358/283 |

FOREIGN PATENT DOCUMENTS

| 0031247 | 7/1981 | European Pat. Off. |
| 2500564 | 7/1975 | Fed. Rep. of Germany |
| 2608134 | 9/1976 | Fed. Rep. of Germany |
| 2627247 | 12/1976 | Fed. Rep. of Germany |
| 2829769 | 1/1979 | Fed. Rep. of Germany |
| 2827596 | 2/1980 | Fed. Rep. of Germany |
| 57-67378 | 4/1982 | Japan |
| 57-58462 | 4/1982 | Japan |
| 57-99865 | 6/1982 | Japan |
| 57-119562 | 7/1982 | Japan |
| 57-125579 | 8/1982 | Japan |
| WO80/02819 | 12/1980 | PCT Int'l Appl. |
| 1320524 | 6/1973 | United Kingdom |
| 1493924 | 11/1977 | United Kingdom |
| 2049345 | 12/1980 | United Kingdom |
| 2089165 | 6/1982 | United Kingdom |

Primary Examiner—Howard W. Britton
Assistant Examiner—John K. Peng
Attorney, Agent, or Firm—Marshall, O'Toole, Gerstein, Murray & Bicknell

[57] ABSTRACT

Apparatus and method for generating screened halftone images, which includes means for assuming an area of halftone dots with desired periodicity and tone reproducibility, subdividing the area into minute cells and setting address values (X, Y) for each of the minute cells, computing out a threshold value of density for each of said cells as a function f (X, Y) of the relevant address values (X, Y), and using the computed value as threshold value of density for the cell, means for obtaining a density-related video signal of the portion of the original corresponding to each of said cells by scanning the original, and means for producing halftone dot signals by comparing the video signals and the threshold value of density with each other.

4 Claims, 6 Drawing Figures

VIDEO SIGNAL-68

VIDEO SIGNAL-240

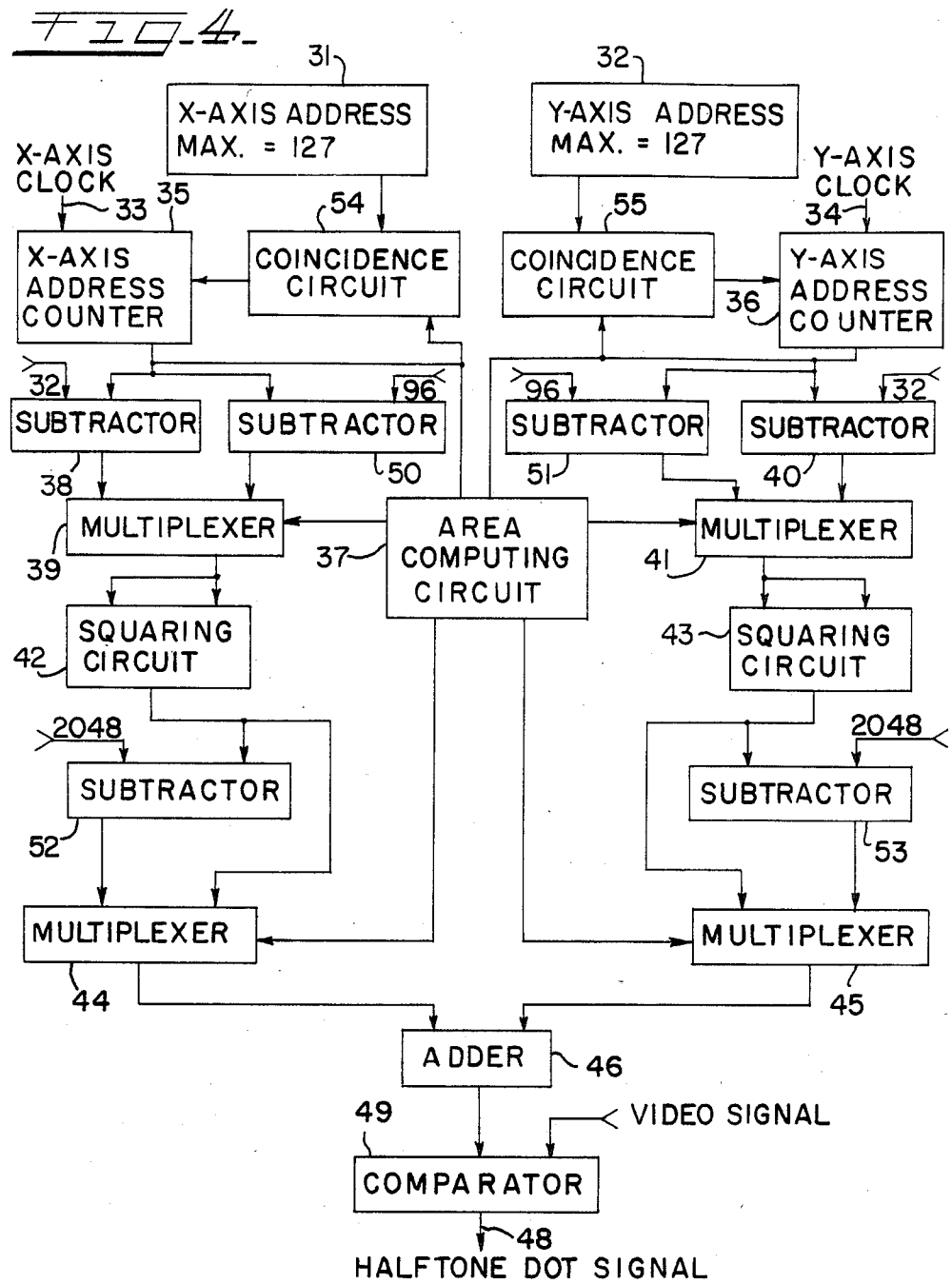

METHOD AND APPARATUS FOR GENERATING SCREENED HALFTONE IMAGES

The present invention relates to a method of and apparatus for generating halftone images, and more particularly, to a novel apparatus and method for generating halftone images electronically without the use of contact screens.

BACKGROUND OF THE INVENTION

Up to the present time, when an original such as a photograph or a picture having a continuous tone image is to be reproduced by printing in large quantities, it has been necessary to convert the continuous tone image of the original to an image formed by dots (called screened halftone or halftone dots) having various sizes (size to area ratio) according to the image density of the original. This screened halftone image is, then, formed on a printing plate in order to reproduce the image of the photograph, picture, etc. in large quantities, using conventional printing plates and inks.

When converting a continuous tone image into a screened halftone image consisting of various size halftone dots, contact screens having a regular density gradient are normally employed. In practice, when a screened halftone image is to be formed, a contact screen is placed directly on a recording material (such as a lith type film) for a screened halftone image, and the original, such as a transparency, having a continuous tone image is exposed by a process camera through the contact screen onto the recording material; a screened halftone image consisting of various size halftone dots is thereby formed on the recording material, the sizes of the dots being a function of the quantity of light corresponding to the density of the original and the density gradient of the contact screen.

In recent years, other methods using a scanning instrument called a scanner and directly converting a continuous tone original to a screened halftone image, without the use of a process camera, have become the main stream method of recording screened halftone images. The scanner used in such a process is called a direct scanner. The methods for recording screened halftone images by use of such direct scanners can be divided into two types; one type is to use a contact screen similar to those used in the aforementioned process of forming a screened halftone image using a process camera so as to generate screened halftone images, and the other type is to electronically generate halftone images by means of an electronic halftone dot generator stored in a direct scanner, thereby eliminating the contact screen.

In the first type of direct scanner mentioned above using a contact screen, an original with continuous tone image is scanned to obtain electronic video signals corresponding to the density of the image. A light beam of a light source which is modulated by the video signals thus obtained is used to scan and expose, through a contact screen, the recording material that is placed in direct contact with the screen, so as to record the screened halftone image. Since this method is similar to the conventional one that uses a process camera, it is a familiar method, but it poses a variety of problems due to its use of a contact screen. As contact screens themselves suffer scratches, stains, etc. in use, they cannot be used repeatedly, and since they are expensive, the cost of this process is high. To obtain a screened halftone image having good quality, it is essential to keep the contact screen and the recording material in sufficiently close contact, but insufficient contact often occurs and results in irregularities in the configuration and the size of the halftone dots. Dirt or dust may be present between the contact screen and the recording material and prevent close contact. Further, the use of a contact screen itself will often produce fringes around halftone dots, similar to the case of optically recorded screened halftone images using a conventional process camera. Accordingly, the size of the halftone dots will become unstable, and, in turn, after the completion of the screened halftone image recording, it will be often required to correct the size of the halftone dots to the desired one by some method such as dot etching.

In addition, since the exposure is made through a contact screen on a recording material, the light source for the exposure is required to have a high power, requiring a higher cost, and the exposure speed (scanning speed) cannot be increased much. It also takes time to set up the contact screen. Thus, a variety of disadvantages are present in this method.

In order to eliminate the aforementioned various disadvantages caused by the use of a contact screen, the second method, which requires no contact screen, has been used.

This latter method electronically generates halftone dots, and a halftone dot-generator is included in direct scanners used for this purpose. Such a generator of the scanner is also called a dot-generator or halftone generator. The use of an electronic halftone dot-generator will solve all of the problems arising from the use of a contact screen, and hard halftone dots without any fringes will be obtained, and the scanning speed will be enhanced; this method is thus advantageous in terms of operability, quality, stability, material costs, etc., and has become the primary method for generating halftone images. A variety of methods for generating halftone dots by means of electronic halftone dot-generators have been devised and put to practical use up to the present time.

In one such method, values of all halftone dots of various sizes (e.g. halftone dots of from 5% to 95% of maximum at 5% interval) are stored in a memory. Values of halftone dots corresponding to the density-related video signal levels obtained by scanning the original, are read out in sequence from the memory, to compare with and to control the exposure light beam from the recording light source and to record the halftone image. In this method wherein the tone reproduction of the halftone image is determined by the number of the values stored in the memory, it will be necessary to increase the number of the values of the halftone dots stored in the memory in order to obtain a smoother tone reproduction, but this, in turn, poses a problem of requiring an increased memory capacity. This method is disclosed in Behane et al. U.S. Pat. No. 3,604,846 and French Pat. No. 1,585,163.

Another method is to divide the unit area of a contact screen used in the conventional methods into minute cells, and allot a specific threshold value of density to the address of each minute cell, store said value in a memory, scan the original and generate a density-related video signal, electronically compare and control whether to expose or not the minute cell of the reproduction according to the density-related video signal, which is obtained by scanning the original, corresponding to the scanned minute cell, and thus record a screened halftone image in sequence. This method is disclosed in Schreiber U.S. patent application Ser. No. 576,851 (Japanese Patent Provisional Pub. No. SHO. 51-138445).

Accordingly, in this method, each halftone dot consists of a group of plural minute cells, the exposure of which is individually controlled by the electronic halftone dot generating signals. The size of each individual minute cell is always constant, and the number of minute cells will vary according to the optic density (highlight middle shadow) of the continuous tone image of the original.

The inventors of the present invention have concentrated their energies on the study of electronic screened halftone image recording and developed a novel apparatus and method for computing out threshold values of density from some functions without storing them in a memory, thereby avoiding the need for a large memory.

SUMMARY OF THE INVENTION

According to the present invention, apparatus and method are provided for generating screened halftone images, which includes means for assuming an area of halftone dots with desired periodicity and tone reproducibility, subdividing the area into minute cells and setting address values (X, Y) for each of the minute cells, computing out a threshold value of density for each of said cells as a function f (X, Y) of the relevant address values (X, Y), and using the computed value as threshold value of density for the cell, means for obtaining a density-related video signal of the portion of the original corresponding to each of said cells by scanning the original, and means for producing halftone dot signals by comparing the video signals and the threshold value of density with each other.

According to this method, the reading point of the original image, which shifts consecutively from one cell to the next as the scanning proceeds, is assumed to be the address values (X, Y) of a minute cell, which is obtained by subdividing a specific or assumed area of halftone dots, having the desired tone reproducibility and periodicity, and the threshold value of density is computed out from a function f (X, Y) using the address values (X, Y) to be used as the threshold value of density of the address; as the scanning proceeds, the address values (X, Y) will be updated, and the threshold value of density will be obtained by computing out the function f (X, Y) again. The density-related video signal of a cell, obtained by scanning the original, and the computed threshold value of density are compared with each other by a comparator, and a halftone dot signal having either ON or OFF values for exposure on a reproducing or recording material, will be generated depending on whether the video signal is greater or less than the threshold value. A light beam from a light source will be turned on or off by this halftone dot generating signal to expose or not expose the cell of the relevant address on the recording material, etc. A plurality of such cells will, all together, form the whole of a halftone dot of desired size.

BRIEF DESCRIPTION OF THE DRAWINGS

A preferred embodiment of the present invention is shown in the accompanying drawings, wherein:

FIG. 4 is a diagram showing the circuit configuration, including the arithmetic unit of threshold value of density generator of the system shown in FIG. 1, for producing the area of halftone dots of FIG. 3.

DETAILED DESCRIPTION OF THE DRAWINGS

Figure 1:
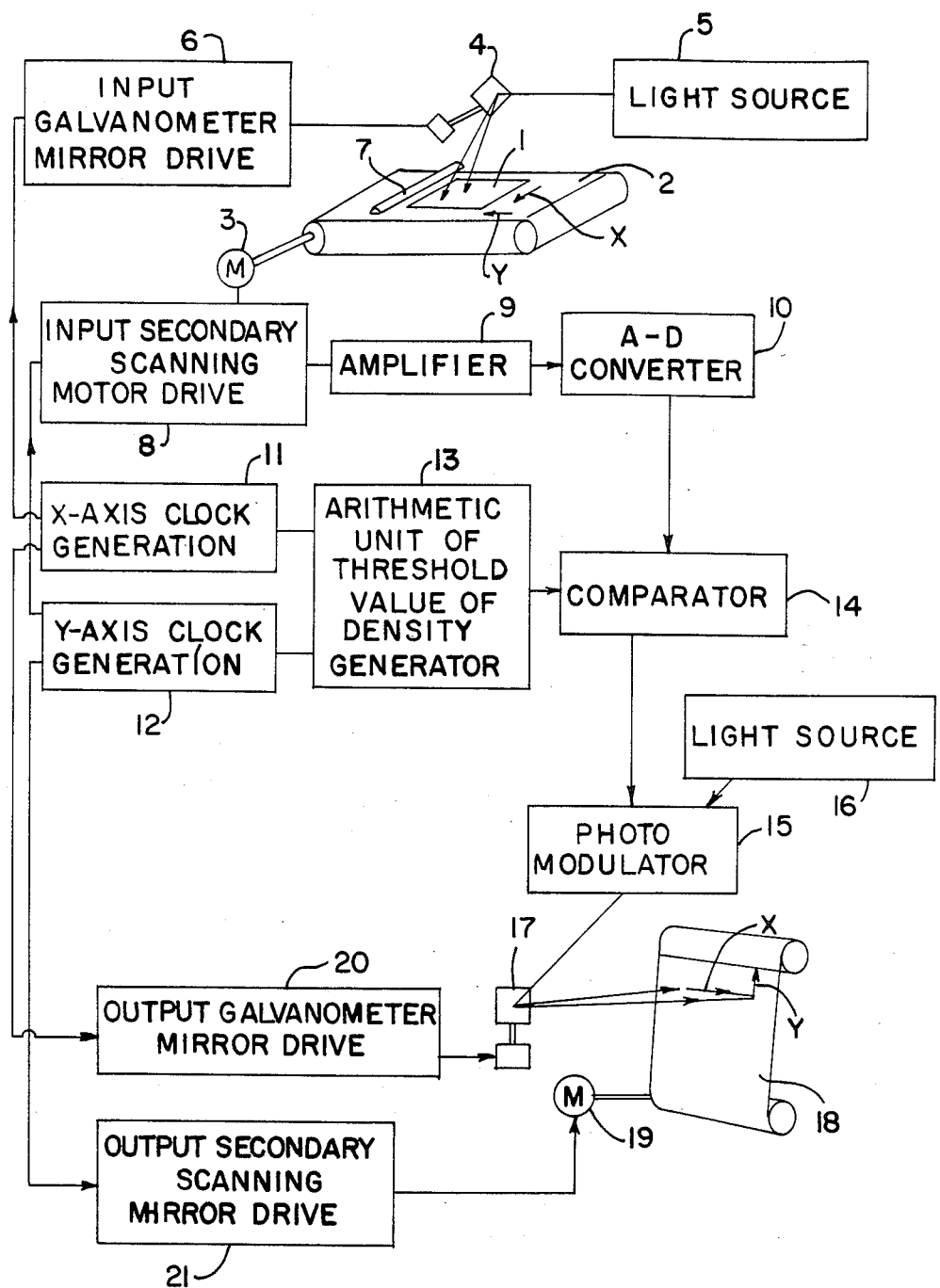
FIG. 1 is a block diagram of an embodiment of the invention, including a flat-bed direct scanner system of a halftone dot generator.

In FIG. 1, an original image 1, such as a continuous-tone photograph, is placed on an original transfer belt 2. The light beams, which may be laser beams, from a light source 5 are polarized in the transverse axis or direction X by a movable galvanometer-mirror 4 or the like to transversely scan the original, and the electronic video signals corresponding to the image darkness or density of the original 1 are measured by an opticelectro transducer 7, which may be a photodiode. These electric video signals are shaped or processed including amplification in a unit 9, and the video analog signals are converted by an analog-to-digital converter 10 to digital video signals. If necessary, corrections, such as tone correction and edge enhancement, may be made. At the same time, the original is scanned in the longitudinal direction Y in a similar manner by moving the transfer belt 2 by an electric motor 3. The threshold value of density generated by an arithmetic unit of threshold value of density generator 13, and the video signals obtained from the analog-to-digital converter 10 are compared with each other by a comparator 14, and the resulting signals (either ON or OFF) for the screened halftone image generation are fed to a photo-modulator 15 or the like. The light beams emitted from a light source 16 (which may emit laser beams or the like) are controlled or modulated by the photo-modulator 15, before the beam is passed to scan and expose a recording material 18. The beam is directed to the material 18 by means of a movable output galvanometer-mirror 17 to record the screened halftone image in the transverse X direction. The recording material 18 is simultaneously moved in the longitudinal direction Y by a motor 19.

For timing the scanning operation, a circuit 11 for generating X-axis clock pulses or signals and a circuit 12 for generating the Y-axis clock pulses or signals are provided to transmit respective timing signals to an input galvanometer-mirror drive circuit 6, an output galvanometer-mirror drive circuit 20, an original transfer motor drive circuit 8, and a recording materials shift motor drive circuit 21, and, at the same time, to transmit both X-axis and Y-axis clock signals to the arithmetic unit of threshold value of density generator 13 so as to generate halftone dots. The generators 11 and 12 produce series or trains of timing signals which cause the various circuit components to operate in coordinated fashion, and these generators may be connected for coordinated action. Thus the beams from the sources 5 and 16 scan the image 1 and the material 18 in synchronism and the motors 3 and 19 move the image 1 and the material 18 in synchronism. Further, the generator 13 is operated in synchronism with these movements. The X-axis scanning speed governed by the generator 11 is coordinated with the longitudinal movement produced by the generator 12 so that the entire area of the original 1 is scanned.

FIG. 1 illustrates a flat-bed scanning system, but other types of scanning systems, including a revolving drum system, are also applicable. The devices for implementing the present invention should not be understood to be confined to those shown in FIG. 1.

The threshold value of density arrangement using functions will now be explained.

Figure 2:
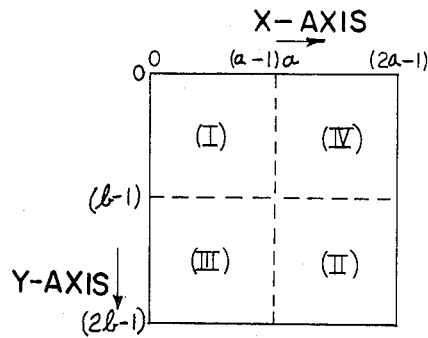
FIG. 2 is a diagram showing the relationship between the coordinate axes and the divided sections of a specific area of halftone dots.

As an example, a halftone dot area which is equivalent to two customary halftone dot areas is assumed as shown in FIG. 2, as a halftone dot area having periodicity, and is divided into four quarter sections (I), (II), (III) and (IV), as shown. Each section has the dimension a on the X axis and the dimension b on the Y axis. Each section is further divided into a plurality of minute cells. When the threshold value of density for the cells having positions x, y and contained in the sections and having address values (X, Y), is to be expressed as functions of the address values (X, Y) on the X- and Y-axes, the following functions may be used: for cells in the section (I), or when $0 \leq x < a$, and $0 \leq y < b$, $$f(I)(x,y) = (x - \tfrac{1}{2}a)^2 + (y - \tfrac{1}{2}b)^2;$$

for the section (II), or when $a \leq x < 2a$, and $b \leq y < 2b$, $$f(II)(x,y) = (x - 3/2a)^2 + (y - 3/2b)^2;$$

for the section (III), or when $0 \leq x < a$, and $b \leq y < 2b$, $$f(III)(x,y) = a \times b - [(x - \tfrac{1}{2}a)^2 + (y - 3/2b)^2]$$

and for the section (IV), or when $a \leq x < 2a$, and $0 \leq y < b$, $$f(IV)(x,y) = b \times a - [(x - 3/2a)^2 + (y - \tfrac{1}{2}b)^2]$$

(where a and b are positive even numbers).

With the threshold value of density expressed as these functions, in the sections (I) and (II), the threshold value of density increases from the center towards the periphery of each section; in the sections (III) and (IV), the threshold value of density increases from a value greater than the maximum value of the sections (I) and (II) further towards the center.

Figure 3:
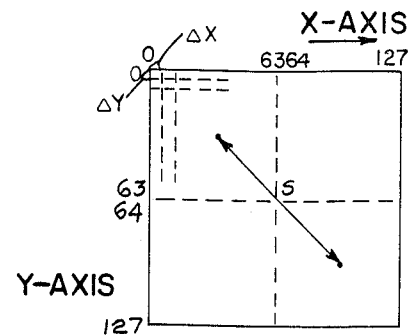
FIG. 3 is a diagram showing the relationship between the screen ruling and the minimum pitches of the X- and Y-axes in the area of halftone dots.

Now, in order to form halftone dots with a regular period, the maximum value of the X-axis address, which is (2a−1), and the maximum value of the Y-axis address, which is (2b−1), are set as the repeat periods. When, as a specific example, the maximum value of the X-axis address and the maximum value of the Y-axis address are both 127, as shown in FIG. 3, both coordinates of the X- and Y-axes can be any values of from 0 up to 127. When the screen ruling for halftone dots is L lines per inch, the minimum pitches Δx and Δy of the respective X- and Y-axes are as follows:
halftone dot pitch S = 25,400/L (um);
X-axis minimum pitch ΔX = S/128 cos 45°; and
Y-axis minimum pitch ΔY = S/128 cos 45°.
The functions f (X, Y) in this case are expressed by the following equations:
when a=64 and b=64, (I) when $0 \leq x < 64$, and $0 \leq y < 64$, $$f(x,y) = (x - 32)^2 + (y - 32)^2 \qquad (I);$$

(II) when $64 \leq x < 128$, and $64 \leq y < 128$, $$f(x,y) = (x - 96)^2 + (y - 96)^2 \qquad (II);$$

(III) when $0 \leq x < 64$, and $64 \leq y < 128$, $$f(x,y) = 4096 - [(x - 32)^2 + (y - 96)^2] \qquad (III);$$

and (IV) when $64 \leq x < 128$, and $0 \leq y < 64$, $$f(x,y) = 4096 - [(x - 96)^2 + (y - 32)^2] \qquad (IV).$$

The construction and operation of halftone dot generation in the generator 13 is further described in connection with FIG. 4. For each output pulse on the X-axis clock line 33 from the generator 11, or from the Y-axis clock line 34 from the generator 12, the scanning of the X-axis or the Y-axis is advanced by the distance ΔX or ΔY, respectively (see FIG. 3). A counter 35 of the X-axis address 31 and a counter 36 of the Y-axis address 32 are both cleared to zero or nil by the coincidence circuits 54 and 55 when their associated counters 35 and 36 proceed to 128 ΔX or 128 ΔY, respectively. Accordingly, the same functions are repeatedly computed for every distance or step through the values 128 ΔX and 128 ΔY. As the equations differ in sections (I), (II), (III), and (IV), respectively, the section is identified by a section or area computing circuit 37.

Now, the case when X-axis and Y-axis address values are $0 \leq x < 64$ and $0 \leq y < 64$, which is in the section (I), will be explained. The output of a multiplexer XA 39 which receives an input from a subtractor 38 (preset to 32) will be (x−32), and similarly, the output of a multiplexer YA 41 which receives an input from a subtractor 40 (preset to 32) will be (y−32). These outputs are inputted to squaring circuits 42 and 43 to compute the squares of the respective values, and the outputs of a multiplexer XB 44 will be $(x-32)^2$, and the output of a multiplexer YB 45 will be $(y-32)^2$. These outputs are inputted to an adder 46 to obtain the value from Equation (I), of $f(x,y) = (x-32)^2 + (y-32)^2$. This output f (x, y) is the result of the computation of the halftone dot function, and is to be compared with a video signal on line 47 (such as from the converter 10) by a comparator 49 (corresponds to comparator 14). If the value of the output f (x, y) is larger than the video signal on line 47, the halftone dot signal on the output 48 will represent ON, and if smaller, it will represent OFF.

Next, for the section (II), to produce Equation (II), subtractors 50 and 51 (preset to 96) are used. For the section (III), to produce Equation (III), subtractors 38, 51, 52 and 53 are used. Subtractors 52 and 53 are preset to 2048. Further, for the section (IV), to produce Equation (IV), subtractors 40, 50, 52 and 53 are used together and a calculation is made in the same manner as for section (I).

Figure 5A:
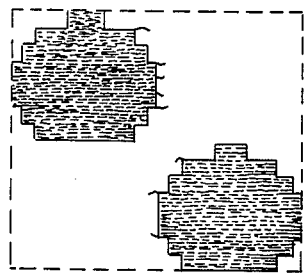
FIGS. 5A and 5B are diagrams showing patterns of halftone dots generated by the apparatus and method of the present invention.
Figure 5B:
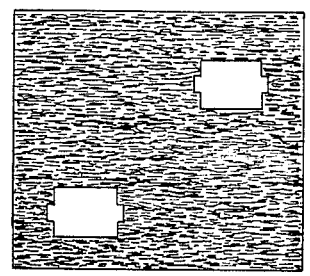

Examples of halftone dot patterns obtained by the present invention are shown in FIGS. 5A and 5B. When the video signal density value ranges between 0 to 255, the whole area is white or blank when the value is 0, and it is entirely black when the value is 255. The pattern for a video signal having a value of 68 is shown in FIG. 5A where 68 of the 255 cells are black, and the pattern for a video signal having a value of 240 is shown in FIG. 5B where 240 of the cells are black. In these examples, the X-axis address is incremented from 0 to 127 by ΔX=1, and the Y-axis address is incremented from 0 to 127 by ΔY=8.

As described so far, according to the method of the present invention, the patterns of halftone dots can be represented by functions without dividing one unit area of a contact screen and storing the threshold values of density in a memory, etc., and threshold value of density can be easily generated by computing out their values without relying on a storage such as memories. Furthermore, according to the method of the present invention, it is possible to generate symmetric patterns other than a square pattern by varying the values of a, b, and the method is advantageous in that halftone dot recording can be effected by a simple circuit configuration.

In the aforementioned embodiment, the present invention has been described for the case in which the screen angles are set at 45°, or halftone dots are generated from black and white continuous tone original. The method, however, is also applicable to the generation of halftone dots from color originals. For generating halftone dots from color originals, as the objective is to prepare printing plates for multicolor printing, color separated screened halftone image plates must be prepared for the required colors. In this case, it is sufficient to make color separation of the color original and to scan one of the color separated originals, and compare the video signal of each cell of said original with the threshold value of density calculated from the function f (X, Y) of the address values (X, Y) according to the method of the present invention. In doing so, what is most important is to vary the screen angle for each color, and according to the method of the present invention, the threshold values of density required for generating halftone dots for the respective screen angles can be generated by converting the X-Y coordinate system to any X'-Y' coordinate system set at an angle relative to the former one and computing the address values (X', Y') for the corresponding address values (X, Y).

Furthermore, the signals for generating screened halftone images obtained by the present invention can directly control the output unit (such as the laser beams for exposing a recording material) or the halftone dot signals can be temporarily stored in an external storage.

What is claimed is:

1. A method for generating screened halftone images in order to reproduce an original, which comprises an area of halftone dots with desired periodicity and tone reproducibility, subdividing said area into minute cells, setting address values (X, Y) for each minute cell, computing out the threshold value of density for each of said cells of said area as a function f (X, Y) of the relevant address values (X, Y), using the computed value for each cell as the threshold value of density for the cell, obtaining a density-related video signal of the portion of the original corresponding to each of said cells by scanning the original, and obtaining screened halftone dot signals by comparing the video signals with the signals of threshold value of density.

2. A method as claimed in claim 1, wherein a rectangular area of halftone dots consisting of cells of which X-axis addresses range from 0 to (2a−1) and Y-axis addresses range from 0 to (2b−1) is assumed, said area representing an area equivalent to substantially two halftone dots, said halftone dot area being divided into the following four sections I, II, III and IV and the signals of threshold value of density of the respective cells having the address values (X, Y) and being contained in the respective sections are obtained by computing the following four functions f (X, Y): for the section (I), or when $0 \leq x < a$, and $0 \leq y < b$, $$f(I)(x,y) = (x - \tfrac{1}{2}a)^2 + (y - \tfrac{1}{2}b)^2;$$

for the section (II), or when $a \leq x < 2a$, and $b \leq y < 2b$, $$f(II)(x,y) = (x - 3/2a)^2 + (y - 3/2b)^2;$$

for the section (III), or when $0 \leq x < b$, and $b \leq y < 2b$, $$f(III)(x,y) = a \times b - [(x - \tfrac{1}{2}a)^2 + (y - 3/2b)^2];$$

and for the section (IV), or when $a \leq x < 2a$, and $0 \leq y < a$, $$f(IV)(x,y) = b \times a - [(x - 3/2a)^2 + (y - \tfrac{1}{2}b)^2]$$

(where a and b are positive even numbers).

3. Apparatus for generating screened halftone images, comprising means for assuming an area of halftone dots with desired periodicity and tone reproducibility, means for setting address values (X, Y) for each minute cell obtained by subdividing said area, means for computing out the threshold value of density for each of said cells of said area as a function f (X, Y) of the relevant address values (X, Y) and using the computed value as the threshold value of density for the cell, means for obtaining a density-related video signal of the portion of the original corresponding to each of said cells by scanning the original, and means for obtaining screened halftone dot signals by comparing the video signals and the signals of threshold value of density with each other.

4. Apparatus as claimed in claim 1, wherein a rectangular area of halftone dots consisting of cells of which X-axis addresses range from 0 to (2a−1) and Y-axis addresses range from 0 to (2b−1) is assumed, said area representing an area equivalent to substantially two halftone dots, and said halftone dot area being divided into four sections I, II, III and IV, and the signals of threshold value of density of the respective cells having the address values (X, Y) and being contained in the respective sections are obtained by computing the following four functions f (X, Y): for the section (I), or when $0 \leq x < a$, and $0 \leq y < b$, $$f(I)(x,y) = (x - \tfrac{1}{2}a)^2 + (y - \tfrac{1}{2}b)^2;$$

for the section (II), or when $a \leq x < 2a$, and $b \leq y < 2b$, $$f(II)(x,y) = (x - 3/2a)^2 + (y - 3/2b)^2;$$

for the section (III), or when $0 \leq x < a$, and $b \leq y < 2b$, $$f(III)(x,y) = a \times b - [(x - \tfrac{1}{2}a)^2 + (y - 3/2b)^2];$$

and for the section (IV), or when $a \leq x < 2a$, and $0 \leq y < b$, $$f(IV)(x,y) = b \times a - [(x - 3/2a)^2 + (y - \tfrac{1}{2}b)^2]$$

(where a and b are positive even numbers).

* * * * *